Patented Jan. 14, 1941

2,228,369

UNITED STATES PATENT OFFICE 2,228,369

DYEING ANIMAL FIBROUS MATERIALS

Conrad Schoeller, Ludwigshafen-on-the-Rhine, Germany, assignor to General Aniline & Film Corporation, a corporation of Delaware No Drawing. Application December 15, 1934, Serial No. 757,679. In Germany December 29, 1933

6 Claims. (Cl. 8—54)

The present invention relates to a process of dyeing animal fibrous materials which term includes mixed fabrics which contain animal fibres, and preparations suitable for this process.

In the dyeing of animal fibres it is usually necessary in order to obtain strong dyeings to carry out the dyeing at the boiling temperature of the dye-bath or while adding comparatively large amounts of organic or inorganic acids. The operation at the boiling temperature and the employment of high acid concentrations frequently give rise to injury to the goods to be dyed and corrosion of the parts of the dyeing apparatus which are sensitive to acid; moreover the dyeings obtained with many dyestuffs are still unsatisfactory in spite of the said precautions.

I have now found that the said drawbacks are avoided and animal fibrous materials can be dyed in a most satisfactory manner by treating them with acid dyestuffs in the presence of water-soluble substances free from sulphonic groups, capable of reacting with the dyestuffs employed with the formation of salts and which contain at least one of the hetero atoms trivalent or pentavalent nitrogen, pentavalent phosphorus and tetravalent sulphur and contain at least one radicle having at least 6 carbon atoms. This radicle may be an aromatic or, preferably, an aliphatic one. The fibres may be pretreated with the said substances or the latter may be added to the dyebath. It is to be noted that the said substances are employed in a water-soluble form; if they are not water-soluble by themselves they are used in the form of water-soluble derivatives; for example amines of unsatisfactory solubility may be applied in the form of water-soluble salts, such as hydrochlorides or hydrobromides.

As suitable substances of the kind defined may be mentioned for example amines which have in addition to the radicle of high molecular weight also hydroxyalkyl radicles, as for example lauryl monoethanol amine or cetyl diethanol amine (obtainable by reacting diethanol amine with the sodium salt of the acid cetyl sulphuric ester according to the process described in the British Patent No. 369,614), or esters of hydroxyalkylamines (as for example of monoethanolamine, diethanolamine, triethanolamine, dimethylethanolamine or phenylbutanol amine

the latter compound may be prepared by reacting isobutylene oxide with aniline) with aliphatic carboxylic acids of high molecular weight, such as lauric, stearic or oleic acid, or the salts of the said esters with inorganic or organic acids. Quaternary ammonium bases, such as trimethyl-octylammonium hydroxide (obtainable by reacting trimethylamine with octyliodide and converting the trimethyl octylammoniumiodide obtained into the corresponding hydroxide), tripropyl-laurylammonium hydroxide (obtainable by reacting tripropyl amine with lauryl iodide and converting the tripropyl-lauryl-ammonium iodide obtained into the corresponding hydroxide), diethyl-phenyl-cetyl-ammonium hydroxide (obtainable by reacting diethylaniline with cetyl iodide and converting the diethyl-phenyl-cetyl-ammonium iodide formed into the corresponding hydroxide), trimethyloleylammonium hydroxide (obtainable by reacting trimethylamine with oleyl iodide and converting the trimethyl-oleyl-ammonium iodide formed into the hydroxide), and the hydrochlorides, as for example dimethyl-phenylbenzylammonium chloride, or bromides, iodides, sulphates and acetates of the said bases and furthermore benzylpyridinium chloride and dodecylpyridinium chloride are also suitable. The salts of aliphatic amines of high molecular weight or their substitution products, as for example laurylamine hydrochloride and dimethyl-oleylamine hydrobromide (obtainable according to the process described in the British Patent No. 369,614), and the reaction products of halogen paraffins with amines or polyamines or condensation products of fatty acids of high molecular weight and amines, alkylated alkylene diamines, reaction products of halogenated paraffins with ammonia and amines are also suitable. Suitable compounds of phosphorus are for example trimethyl-octylphosphonium hydroxide (obtainable by reacting trimethyl phosphine with octyl iodide and converting the iodide formed into the hydroxide) or triethylcetylphosphonium bromide (obtainable by reacting triethylphosphine with cetyl bromide). Compounds of tetravalent sulphur which may be employed for the process according to this invention are for example dimethyl-octodecyl sulphonium hydroxide (obtained by reacting dimethyl thioether with octodecyl iodide and converting the iodide formed into the corresponding hydroxide) and dipropyl-laurylsulphonium bromide (obtainable by reacting dipropyl-thioether with lauryl bromide).

The pretreatment of the fibres is preferably effected in aqueous solution at ordinary or elevated temperature. The liquor may be neutral, acid or alkaline. The said compounds may also be dissolved in organic solvents such as ethyl alcohol, acetone and carbon tetrachloride for the pretreatment of the fibres.

The process according to the present invention may be used for dyeing all kinds of animal fibres, as for example wool, silk or textiles containing the same or also for hairs and leather. Mixed fabrics containing animal fibres and non-animal fibres may be dyed with advantage according to the present invention.

The textiles pretreated in the said manner yield by dyeing, especially at temperatures below the boiling point or when employing comparatively small amounts of acid (for example 5 per cent of the weight of the goods), deep and level dyeings. Also when printing animal fabrics the said pretreatment offers advantages because deep prints are obtained. When the said compounds are added directly to the dyebath, dyeing may be carried out in the usual manner but at relatively lower temperatures and/or with a lower acid concentration. Also in this case deep and vigorous (clear) dyeings are obtained. The said compounds are especially suitable for dyeing with metal complex compounds of acid wool dyestuffs.

In order to obtain uniform impregnation and dyebaths free from objection it is frequently preferable, during the pretreatment or dyeing in the presence of the said compounds, to employ dispersing agents (which includes wetting agents and compounds having a protective colloid action) or water-soluble organic solvents or other substances. It is the advantage of the dispersing agents to be added that they do not only yield no precipitates with the additions themselves but that they prevent even the formation of precipitates which might result from the reaction of the dyestuffs with the additions to be used according to the present invention. For example Turkey red oils, sulphonation products of aliphatic alcohols of high molecular weight, true sulpohnic acids of organic compounds, condensation products of carboxylic acids of high molecular weight and hydroxy or aminoalkyl sulphonic acids or albumen degradation products, alkylated aromatic sulphonic acids or the salts of the said compounds, water-soluble reaction products of alkylene oxides such as ethylene oxide on compounds containing hydroxy, carboxylic or amino groups in the molecule may be employed in this case. Further suitable additional substances are solvents, such as ethyl alcohol, ethylene glycol ethers, polyglycol ethers, polyglycol glycerines, polymerized ethylene oxide and pyridine. The addition of dispersing agents (protective colloids) is of special value when additions are used which do not contain hydrophilic groups such as hydroxy groups and ether bridges as are introduced into organic compounds containing reactive hydrogen atoms by the reaction with ethylene oxide. Further additions are inorganic salts, especially alkali metal phosphates, alkalies and waterglass, which have a swelling action on the fibres to be dyed, and also hydroxyalkylamines.

It is an advantage of the present invention that the dyeing may be carried out at conditions which are distinctly more moderate than usual in the dyeing of animal fibres. On the one hand the temperature to be applied is below the boiling point of the dyebath, for example from 60 to 90° C., or even lower, for example 40° C. Especially when dyeing with acid wool dyestuffs this moderation of the temperature is of advantage. Another feature of the present process is that lower amounts of acid such as sulphuric acid may be added during the dyeing than are necessary when the dyeing is carried out in the absence of the special additions. Especially when conplex metal compounds of acid wool-dyestuffs, for example chromium or copper compounds of azo-dyestuffs are used for the dyeing of animal fibres such as wool, real silk, leather, hair and the like the moderation of the amount of acid to be added is preferable. It is not possible to state the exact amount of acid which is necessary since this amount varies with the dyestuffs. But as a rule it may be stated that distinctly higher pH-values are suitable than those which are considered to yield the optimal results when the special substances defined above are not employed. I intend by the term "milder conditions" utilized in the claims, to cover conditions of temperature of treatment that are below the boiling temperature of the bath and generally ranging from 40° to 90° C. and/or conditions of acidity of the bath that are substantially below the acidity of the bath necessary to obtain the same shade on animal fibers with the same dyestuffs at the same temperature, but in the absence of the cation-active substances.

As has already been described above the fibres may be pretreated with the special additions defined and then dyed (directly or after drying) or the said additions may be present in the dyebath. Furthermore it is possible to make up preparations in the solid, preferably powdery, or in the pasty form which contain the dyestuff and the said addition and, if desired, a dispersing agent (or protective colloid); further substances such as dextrine, Glauber's salt or common salt, may be added. By dissolving these preparations suitable dyebaths are obtained. Usually the dyestuffs will be present in these preparations in amounts surpassing the amounts of additional substances of the kind defined.

The following examples will further illustrate the nature of this invention but the invention is not restricted to these examples.

*Example 1*

Merino wool yarn is treated for an hour at 60° C. in a bath containing 3 grams of the reaction product derived from between about 2 and about 3 molecular proportions of ethylene oxide and 1 molecular proportion of dodecyl ethanol amine (obtainable according to the process described in the British Patent No. 369,614) per liter. The yarn is then dyed for an hour at 60° C. with 2.5 per cent of Victoria Rubine O (Color Index No. 184) with an addition of 10 per cent of Glauber's salt and 5 per cent of acetic acid. In this manner a beautiful deep red dyeing is obtained.

*Example 2*

Wool is pretreated with a bath containing 3 grams of trimethyl-dodecyl-ammonium bromide (obtainable by reacting trimethylamine with dodecyl bromide) per liter and then dyed for an hour at 60° C. with 3 per cent of Wool Green BS (ibid, No. 737) with an addition of 10 per cent of Glauber's salt and 5 per cent of acetic acid and 10 per cent of formic acid. The goods are dyed a deep blue-green shade of excellent fastness to rubbing.

If wool which has not been pretreated be dyed at 60° C. under otherwise identical conditions with 2 per cent of Sorbine Red (ibid, No. 54) with an addition per liter of the bath of 1 gram of the formate of the monoester of triethanol-amine with stearic acid or the corresponding amount of the amine specified in Example 1, a deep red dyeing of good fastness to rubbing is obtained.

Example 3

A wool cheviot which has been pretreated at 60° C. in a bath containing 1 gram of the formate of triethanolamine-monostearic acid ester per liter, is dyed at 90° C. with 0.2 per cent of the complex chromium compound of the azo dyestuff from diazotized 4-chlor-2-aminophenol-6-sulphonic acid and 1-phenyl-3-methyl-5-pyrazolone and 0.2 per cent of the complex chromium compound of the azo dyestuff from diazotized 1.2.4-aminonaphthol-sulphonic acid and 1.8-naphthol-sulphonic acid, with the addition of 8 per cent of sulphuric acid. A very level dyeing is obtained.

Example 4

Merino wool yarn which has been treated for an hour at about 60° C. in a bath containing 1 gram of the formate of triethanol-amine-monostearic acid ester is dyed with 1.5 per cent of the complex chromium compound of the azo dyestuff from diazotized 5-nitro-2-aminophenol and 2.5-naphthylamine-sulphonic acid with an additon of 5 per cent of sulphuric acid of 66° Bé. strength. The temperature is raised to boiling point within half an hour and the goods are treated for an hour thereat. A deep, level and vigorous green dyeing is obtained.

Wool yarn is pretreated at 70° C. in a bath containing 3 grams of trimethyl-dodecyl-ammonium bromide per liter and then dyed with the complex chromium compound of the azo dyestuff from diazotized 1.2.4-amino-naphthol sulphonic acid and 1.8-naphthol sulphonic acid. A very pure, vigorous and level dyeing having a good fastness to rubbing is obtained.

If wool be treated in a bath containing per liter from 2 to 3 grams of triethyl-dodecyl-phosphonium bromide (obtainable by reacting triethyl phosphine with dodecyl bromide) for an hour at 50° C. and then dyed with 1.5 per cent of the complex chromium compound of the azo dyestuff from diazotized 4-chlor-2-aminophenol-6-sulphonic acid and 2.4-dihydroxy-quinoline with an addition of 5 per cent of sulphuric acid of 66° Bé. strength, the goods are dyed a deep red shade. If the pretreatment be carried out in a bath containing 3 grams of the methylsulphuric acid salt of methyl-ethyl-cetyl-sulphonium hydroxide (obtainable by reacting methyl-ethyl-thioether with cetyl iodide and converting the methylethyl sulphonium iodide formed into the hydroxide) per liter, a deep red dyeing is likewise obtained.

The said base may also be added to the dyebath. In this case wool which has not been pretreated may also be dyed yielding deep dyeings.

Example 5

A not chlorinated wool muslin which has been pre-treated as described in Example 1 is printed in the usual manner with a printing paste which consists of

| | Parts by weight |
|---|---|
| Acid Violet 4BC (Color Index 698) | 30 |
| Glycerine | 50 |
| Water | 400 |
| British gum | 500 |
| Ammonium oxalate | 20 |

After steaming, deep and level prints are obtained.

Example 6

Merino wool yarn is handled for 1 hour at 40° C. in a bath containing per liter 3 grams of trisodium phosphate and 0.5 gram of N-hydroxyethyldodecyl morpholinium bromide (obtainable by converting triethanol amine into N-hydroxyethylmorpholine and reacting the latter with dodecyl bromide) or octodecyl pyridinium bromide and subsequently dyed for 1 hour at 60° C. with 2.5 per cent of Victoria Rubine O (ibid. No. 184), 10 per cent of Glauber's salt, 5 per cent of a 30 per cent acetic acid and 10 percent of an 85 per cent formic acid. A vivid red dyeing is obtained.

Example 7

Wool yarn is dyed for 1 hour at the boiling temperature with 1.5 per cent of a complex chromium compound of the azo dyestuff from diazotized 4-chlor-2-aminophenol-6-sulphonic acid and 2.4-dihydroxy-quinoline with the addition of 5 per cent of sulphuric acid, 1 gram of a mixture of equal parts of trimethyl-dodecylammonium bromide and the condensation product from coconut fatty acid and taurine being added per liter of the dye bath. The yarn is dyed vivid red shades of good fastness to rubbing.

Instead of trimethyldodecylammonium bromide the hydrochloride of the condensation product from oleic acid or the like and asymmetric diethylethylenediamine may be employed with a similar effect.

Example 8

Leather tanned with vegetable tans is treated for an hour at ordinary temperature in a shaking apparatus employing a bath containing per liter 1 gram of dodecyltrimethylammonium bromide, rinsed intensely and subsequently dyed for half an hour at about 40° C. in a neutral bath with 0.5 per cent of Benzo Chrome Brown R (ibid, No. 597). Deep brown shades are obtained while leather which has not been pretreated in the said manner is only weakly dyed even with the addition of acid.

Example 9

Merino wool is dyed for 1½ hours at the boiling temperature with 5 per cent of sulphuric acid and 3 per cent of a preparation containing 85 per cent of Bordeau RN (Schultz, Farbstofftabellen, vol. 2, 1932, page 168), 10 per cent of octodecyl dimethylamine oxide and 5 per cent of the reaction product of 20 molecular proportions of ethylene oxide with 1 molecular proportion of octodecyl alcohol. A deep level dyeing is obtained.

If instead of the said reaction product of ethylene oxide and octodecyl alcohol the same amount of polymerized ethylene oxide is employed a similar effect is obtained.

Example 10

A dyebath is prepared using 2.4 parts by weight of the complex chromium compound of the azo dyestuff from diazotized 6-nitro-1-amino-2-naphthol-4-sulphonic acid and β-naphthol (obtained according to the German patent No. 537,232), 0.024 part by weight of stearyl amine acetate, 0.07 part by weight of the product obtainable by condensing about 20 molecular proportions of ethylene oxide with 1 molecular proportion of octodecyl alcohol, about 2.6 parts by weight of Glauber's salt and 2 parts by weight of the sulphuric acid of 66° Bé. strength. 100 parts by weight of wool are introduced into the said bath at from 60° to 65° C. whereupon the bath is heated up to the boiling point in the course of half an hour. The whole is kept at the boiling temperature for another half an hour, another three parts by weight of sulphuric acid of 66° Bé. strength are added, the boiling being continued for half an hour, once more three parts by weight of sulphuric acid of 66° Bé. strength are added and the bath is boiled for a further half an hour. The wool is rinsed and finished in the usual manner. A deep black bloomy dyeing of excellent fastness properties is obtained.

*Example 11*

Wool yarn is dyed at the boiling temperature with 3 per cent of the complex chromium compound of the azo dyestuff from diazotized 1-amino-2-naphthol-4-sulphonic acid and β-naphthol in the presence of 5 per cent of sulphuric acid (66° Bé.) with the addition of from 0.2 to 0.3 per cent of octodecyl diethanolamine acetate. A deep brown dyeing of good fastness to rubbing is obtained.

*Example 12*

Worsted fabric which can be dyed thoroughly only with difficulty is dyed for one hour at the boiling temperature with 3 per cent of the complex chromium compound of the azo dyestuff from diazotized 1.2.4-aminonaphthol sulphonic acid and 1.8-naphthol sulphonic acid, 5 per cent of sulphuric acid (66° Bé.), 0.3 per cent of the product obtainable by reacting 2 molecular proportions of ethylene oxide with one molecular proportion of oleyl amine and one per cent of the product obtainable by reacting about 20 per cent of ethylene oxide with 1 molecular proportion of oleyl alcohol or oleyl amine. The material is dyed thoroughly and a deep dyeing of good fastness to rubbing is obtained.

*Example 13*

Merino wool yarn is dyed for one hour at 70° C. with a bath with 2 per cent of Fast Light Yellow 3G (Schultz, Farbstofftabellen 1931, No. 732) with the addition of 0.3 per cent of the reaction product of about 3 molecular proportions of ethylene oxide with one molecular proportion of oleyl amine. The wool is dyed thoroughly deep shades of good fastness to rubbing.

*Example 14*

Merino wool yarn is dyed for 1½ hours at 80° C. in a bath containing 3 per cent of Chromotrop Blue A (Schultz, Farbstofftabellen 1931, No. 208) and 0.3 per cent of the condensation product of about 3 molecular proportions of ethylene oxide with one molecular proportion of oleyl amine. The dyeing is then developed by boiling for ¾ hour with the addition of one per cent of potassium chromate whereby a deep blue dyeing of good fastness to rubbing is obtained.

*Example 15*

Merino wool yarn is dyed for 1½ hours at 80° C. with 4 per cent of the complex chromium compound of the azo dyestuff from diazotized 1.2.4-amino-naphtholsulphonic acid with 1.8-naphthol sulphonic acid, 10 per cent of sulphuric acid (66° Bé.), 0.3 per cent of the product obtainable by reacting about 3 molecular proportions of ethylene oxide with one molecular proportion of oleyl amine. A deep blue dyeing is obtained.

The dyeing process may also be carried out with the addition of five per cent of sulphuric acid only while employing 0.3 per cent of the said condensation product and 0.5 per cent of the condensation product of about 25 molecular proportions of ethylene oxide and one molecular proportions of octodecyl alcohol or octodecyl amine; the effect is very similar in this case.

*Example 16*

Worsted piece goods are dyed for 1 hour at 60° C. with 2 per cent of Sorbin Red (Schultz, Farbstofftabellen 1931, No. 105) with the addition of 0.2 per cent of dodecyldiethanolamine and 0.3 per cent of the sodium salt of benzyl naphthylamine sulphonic acid. A very level deep dyeing is obtained.

Instead of the sodium salt of benzyl naphthylamine sulphonic acid the reaction product of 20 molecular proportions of ethylene oxide with one molecular proportion of the amine from lauric acid and ethylene diamine may be employed with a similar effect.

*Example 17*

A mixed fabric consisting of wool and viscose artificial silk is dyed for one hour at from 70° to 80° C. with 3 per cent of Sirius Red 4B (Schultz, Farbstofftabellen, 1931, No. 566), 10 per cent of Glauber's salt, 0.2 per cent of stearyl amine acetate and 1 per cent of the product obtainable by reacting 20 molecular proportions of ethylene oxide with 1 molecular proportion of oleyl alcohol.

A satisfactory dyeing is thus obtained in which not only the artificial silk but also the wool fibres of the mixed fabric are dyed deep shades, while in the absence of stearylamine acetate under otherwise the same conditions the wool fibres of the mixed fabric are dyed only faintly.

Similar effects are obtained if instead of adding stearyl amine acetate to the dyebath a pretreatment of the mixed fabric is carried out with a bath containing per liter 1 gram of the ammonium bromide in which 3 hydrogen atoms of the ammonium radicle are substituted by methyl groups while the fourth hydrogen atom is substituted by the radicle of the alcohol obtainable by hydrogenating the fatty acids of the palmkernel fat; this pretreatment is carried out for 1 hour at about 60° C. and subsequently the dyeing is effected.

*Example 18*

A mixed fabric consisting of wool and natural silk is dyed for 1 hour at about 80° C. with 3 per cent of Sirius Red 4B (Schultz, Farbstofftabellen, 1931, No. 566), 0.2 per cent of octodecyl amine acetate, 1 per cent of the product obtainable by reacting 15 molecular proportions of ethylene oxide with 1 molecular proportion of dodecyl alcohol (or 1 per cent of oleyl methyl tauride), 10 per cent of Glauber's salt, 5 per cent of acetic acid. A satisfactory dyeing is obtained in which not only the silk fibres but also the wool fibres of the mixed fabric are dyed deep shades. (Without the addition of octodecyl amine acetate the wool in the mixed fabric is dyed to an unsatisfactory degree.)

Similar satisfactory results are obtained if instead of making the said addition to the dyebath, a pretreatment of the mixed fabric is carried out therewith at about 40° C. for 1 hour, the pretreating bath containing 1 gram of octodecyl amine acetate per liter.

*Example 19*

Worsted wool is dyed with 1.5 per cent of Amido Blackgreen B (Schultz, Farbstofftabellen 1931, No. 300), 0.3 per cent of the methyl sulphuric acid salt of ethyl-methyl-cetyl sulphonium hydroxide, 10 per cent of Glauber's salt and 5 per cent of 30 per cent acetic acid, the bath being heated up to the boiling temperature in the course of ½ hour, whereupon 3 per cent of 80 per cent formic acid are added and dyeing is effected for 1 hour at the boiling temperature. A deep green dyeing of good fastness to rubbing is obtained the depth, purity and vividness of which is superior to that of the dyeing obtained without the addition of the said sulphonium compound under otherwise similar conditions or in the absence of the said sulphonium compound while adding even 10 per cent of formic acid.

Good results are also obtained when Acid Violet 6BN (Schultz, Farbstofftabellen, 1931, No. 831) is employed together with the said sulphonium compound.

If wool is pretreated with a bath containing 2 grams per liter of the said sulphonium compound for ½ hour at 30° C. and then dyed in the usual manner dyeings are also obtained which are superior in the depth and vividness of the shades to dyeings produced without such a pretreatment.

What I claim is:

1. The process for dyeing animal fibrous materials which comprises treating them with a bath containing an acid dyestuff and a cation-active water-soluble substance free from sulphonic groups, capable of reacting with the dyestuff employed with the formation of a salt, which contains at least one tetravalent sulphur hetero atom and contains at least one aliphatic radicle with at least 6 carbon atoms, the treatment being effected below the boiling temperature of the said bath.

2. The process for dyeing animal fibrous materials which comprises treating them with a bath containing an acid dyestuff and a cation-active water-soluble substance free from sulphonic groups, capable of reacting with the dyestuff employed with the formation of a salt, which contains at least one tetravalent sulphur hetero atom and contains at least one aliphatic radicle with at least 6 carbon atoms, the treatment being effected at between about 40° C. and about 90° C.

3. The process for dyeing animal fibrous materials which comprises treating them with a bath containing an azo dyestuff and a cation-active water-soluble substance free from sulphonic groups, capable of reacting with the dyestuff employed with the formation of a salt, which contains at least one tetravalent sulphur hetero atom and contains at least one aliphatic radicle with at least 6 carbon atoms, the treatment being effected at between about 40° C. and about 90° C.

4. Dye-preparations comprising an acid dyestuff and a cation-active water-soluble substance free from sulphonic groups, capable of reacting with the dyestuff employed with the formation of a salt, which contains at least one tetravalent sulphur hetero atom and contains at least one aliphatic radicle with at least 6 carbon atoms.

5. Dye-preparations comprising an acid dyestuff, a dispersing agent exerting a protective colloidal action and a cation-active water-soluble substance free from sulphonic groups, capable of reacting with the dyestuff employed with the formation of a salt, which contains at least one tetravalent sulphur hetero atom and contains at least one aliphatic radicle with at least 6 carbon atoms.

6. Dye preparation comprising an azo dyestuff, a substance yielding surface active anions and a substance yielding surface active cations, said latter substance containing a tetravalent sulfur hetero atom and an alkyl radicle of at least 10 carbon atoms.

CONRAD SCHOELLER.